US010167384B2

(12) United States Patent
Herklots

(10) Patent No.: US 10,167,384 B2
(45) Date of Patent: Jan. 1, 2019

(54) COMPOSITION COMPRISING HETEROPHASIC PROPYLENE COPOLYMER

(71) Applicant: SABIC GLOBAL TECHNOLOGIES B.V., Bergen op Zoom (NL)

(72) Inventor: Marc Herklots, Roermond (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 88 days.

(21) Appl. No.: 15/532,172

(22) PCT Filed: Nov. 26, 2015

(86) PCT No.: PCT/EP2015/077792
§ 371 (c)(1),
(2) Date: Jun. 1, 2017

(87) PCT Pub. No.: WO2016/087309
PCT Pub. Date: Jun. 9, 2016

(65) Prior Publication Data
US 2017/0267852 A1    Sep. 21, 2017

(30) Foreign Application Priority Data
Dec. 2, 2014 (EP) .................................. 14195838

(51) Int. Cl.
| C08L 23/10 | (2006.01) |
| C08L 23/14 | (2006.01) |
| C08L 51/00 | (2006.01) |
| B29C 45/72 | (2006.01) |
| C08L 67/04 | (2006.01) |
| C08K 3/34 | (2006.01) |
| C08L 23/26 | (2006.01) |

(52) U.S. Cl.
CPC ............. *C08L 23/10* (2013.01); *B29C 45/72* (2013.01); *C08L 23/142* (2013.01); *C08L 51/003* (2013.01); *C08L 67/04* (2013.01); *C08K 3/34* (2013.01); *C08L 23/26* (2013.01); *C08L 2205/025* (2013.01)

(58) Field of Classification Search
CPC ........... C08L 23/12; C08L 23/10; C08L 51/06
See application file for complete search history.

(56) References Cited

U.S. PATENT DOCUMENTS

| 4,399,054 A | 8/1983 | Ferraris et al. |
| 4,472,524 A | 9/1984 | Albizzati |
| 5,482,766 A * | 1/1996 | Mathavan ............... B32B 27/32 |
| | | 428/308.4 |
| 2016/0122505 A1 | 5/2016 | Vandewiele et al. |

FOREIGN PATENT DOCUMENTS

| WO | 2004099303 A1 | 11/2004 |
| WO | 2006010414 A1 | 2/2006 |

OTHER PUBLICATIONS

International Search Report for International Application No. PCT/EP2015/077792; International Filing Date: Nov. 26, 2015; dated Jan. 28, 2016; 3 Pages.
Libster et al., "Advanced Nucleating Agents for Polypropylene," Polym. Adv. Technol. 2007, 18: 685-695.
Written Opinion of the International Searching Authority for International Application No. PCT/EP2015/077792; International Filing Date: Nov. 26, 2015; dated Jan. 28, 2016; 4 Pages.

* cited by examiner

Primary Examiner — Jeffrey C Mullis
(74) Attorney, Agent, or Firm — Cantor Colburn LLP

(57) ABSTRACT

The invention is directed to a composition comprising (A) a heterophasic propylene copolymer, (B) talc and (C) a functionalized polypropylene grafted with an acid or acid anhydride functional group, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 90 to 95 wt % based on the total heterophasic propylene copolymer and (b) a dispersed ethylene-α-olefin copolymer, wherein the dispersed ethylene-α-olefin copolymer is present in an amount of 10 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the heterophasic propylene copolymer has an MFI of 0.1-0.5 dg/min as determined according to ISO1133 at 230° C. and 2.16 kg and wherein the amount of the talc in the composition is 0.025-10 wt % of the total composition and the amount of the functionalized polypropylene is 0.005-2.5 wt % of the total composition.

15 Claims, No Drawings

COMPOSITION COMPRISING HETEROPHASIC PROPYLENE COPOLYMER

CROSS REFERENCE TO RELATED APPLICATIONS

This application is a 371 of International Application No. PCT/EP2015/077792, filed Nov. 26, 2015, which claims priority to European Application No. 14195838.9, filed Dec. 2, 2014.

The invention relates to a composition comprising a heterophasic propylene copolymer and a nucleating agent, to a process for obtaining such composition, to the use of such composition and to an article comprising such composition.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications.

Nucleating agents are chemical compounds or compositions that enable faster nucleation or a higher crystallization temperature of thermoplastic polymers, resulting in productivity gains during their processing and in improved mechanical and physical properties of articles made from such thermoplastics. These compounds provide nucleation sites for crystal growth during cooling of a thermoplastic molten composition. In polypropylenes, for example, a higher degree of crystallinity and more uniform crystalline structure is obtained by adding a nucleating agent such as talc and carboxylate salts, e.g. sodium benzoate. An overview of nucleating agents used in polypropylene-based compositions is given for example in *Polym. Adv. Technol.* 2007, 18, 685-695. However, it is commonly recognized that the use of nucleating agents is a highly unpredictable technology area. Small changes in a molecular structure of the nucleator can drastically alter the ability of a nucleating agent to effectively nucleate a polymer composition. A lot is not known regarding the effect of a nucleating agent on polymer morphology during (re-)crystallization of thermoplastics.

There is a demand for a heterophasic propylene composition which can be processed into articles in a less energy intensive manner. There is further a demand for improving the mechanical properties of a heterophasic propylene composition such as flexural modulus and impact strength.

It is an object of the invention to provide a composition which can be processed into articles in a less energy intensive manner. It is a further object of the invention to provide a composition which results in articles having good mechanical properties such as flexural modulus and impact strength.

This object is achieved by a composition comprising (A) a heterophasic propylene copolymer, (B) talc and (C) a functionalized polypropylene grafted with an acid or acid anhydride functional group, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 60 to 95 wt % based on the total heterophasic propylene copolymer and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the amount of the talc in the composition is 0.025-10 wt % of the total composition and the amount of the functionalized polypropylene is 0.005-2.5 wt % of the total composition.

Preferably, the object is achieved by a composition comprising (A) a heterophasic propylene copolymer, (B) talc and (C) a functionalized polypropylene grafted with an acid or acid anhydride functional group, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 90 to 95 wt % based on the total heterophasic propylene copolymer and (b) a dispersed ethylene-α-olefin copolymer, wherein the dispersed ethylene-α-olefin copolymer is present in an amount of 10 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %, wherein the heterophasic propylene copolymer has an MFI of 0.1-0.5 dg/min as determined according to ISO1133 at 230° C. and 2.16 kg and wherein the amount of the talc in the composition is 0.025-10 wt % of the total composition and the amount of the functionalized polypropylene is 0.005-2.5 wt % of the total composition.

Surprisingly, it has been found that a heterophasic polypropylene composition can be prepared having a high crystallization temperature by the addition of talc and a functionalized polypropylene grafted with an acid or acid anhydride functional group, i.e. the talc and the functionalized polypropylene act as a nucleating agent. The injection moulding or extrusion of a composition with a higher crystallization temperature does not require cooling of the mould to low temperature for the crystallization and solidification of the composition. This has the advantage of saving energy and increasing the cycle time, especially for injection moulding.

It is known that talc acts as a nucleating agent. However, it was surprisingly found that the functionalized polypropylene further increases the effect of the talc for increasing the crystallization temperature.

Additional advantages of the composition according to the present invention may include improved mechanical properties such as flexural modulus and impact strength.

Additional advantages of the composition according to the present invention may include lower shrinkage.

Additional advantages of the composition according to the present invention may include decreased warpage.

It is noted that WO2004/099303 discloses a polypropylene composition comprising 60-65 wt % of a polypropylene resin, 10-15 wt % of an ethylene-alpha-olefin copolymer rubber, 20-25 wt % of talc, 0.5-3.0 wt % of a grafted polypropylene resin, 0.2-0.5 wt % of an unsaturated fatty acid amine and 0.2-0.5 wt % of a scratch-resistant agent. According to WO2004/099303, the polypropylene composition has improved scratch resistance, especially when used in injection-molded articles, such as those found in automotive interiors.

The composition according to the invention has low shrinkage and low warpage, which are critically important for producing pipes by extrusion. The low shrinkage and low warpage are ensured by the relatively low melt flow index (0.1-0.5 dg/min) of the heterophasic propylene copolymer and the relatively low content of the rubber phase (5-10 wt %) in the composition of the invention. Further, the low talc amount in the composition of the invention ensures that the elongation at break is maintained at an acceptable level.

In WO2004/099303, the amount of the ethylene-alpha-olefin copolymer rubber starts at 10 wt % and can be up to 15 wt %. The amount of the polypropylene resin is relatively low (60-65 wt %) and the amount of talc is relatively high (20-25 wt %). Such a high amount of talc leads to a low elongation at break.

WO2004/099303 focuses on automotive interiors made by injection molding and its scratch resistance, and does not mention shrinkage and warpage. Unlike in the production of pipes by extrusion, automotive interiors made by injection molding does not require a low melt flow index of 0.1-0.5 dg/min as in the composition of the present invention. WO2004/099303 does not mention the melt flow index of the polypropylene composition.

(A) Heterophasic Propylene Copolymer

The major part of the composition according to the invention is heterophasic propylene copolymer. Typically, the amount of the heterophasic propylene copolymer is 70-99.97 wt % of the total composition, more typically 80-99.9 wt %, 85-99 wt %, 90-98 wt % or 95-97 wt %

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratios used.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; *Polypropylene and other Polyolefins*, by Ser van der Ven, Studies in Polymer Science 7, Elsevier 1990; WO06/010414, U.S. Pat. No. 4,399,054 and U.S. Pat. No. 4,472,524.

The heterophasic propylene copolymer of the composition of the invention consists of a propylene-based matrix and a dispersed ethylene-α-olefin copolymer. The propylene-based matrix typically forms the continuous phase in the heterophasic propylene copolymer.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms and is preferably ethylene.

Preferably, the propylene-based matrix consists of a propylene homopolymer.

The melt flow index (MFI) of the propylene-based matrix (before it is mixed into the composition of the invention) may be in the range of for example 0.3 to 200 dg/min, for example from 0.3 to 80 dg/min measured according to ISO1133 (2.16 kg/230° C.), for example in the range from 3 to 70, for example in the range from 10 to 60 dg/min, for example in the range from 15 to 40 dg/min. Preferably, the MFI of the propylene-based matrix is at least 0.1 dg/min, for example at least 0.2 dg/min, for example at least 0.3 dg/min, and/or for example at most 10 dg/min, at most 5 dg/min, at most 2 dg/min, at most 0.6 dg/min or at most 0.5 dg/min. Preferably, the MFI of the propylene-based matrix is 0.2-0.5 dg/min.

The propylene-based matrix is present in an amount of 60 to 95 wt %, for example 65 to 94 wt %, for example 70 to 93 wt %, for example 75 to 92 wt % based on the total heterophasic propylene copolymer. Preferably, the propylene-based matrix is present in an amount of 90 to 95 wt % based on the total heterophasic propylene copolymer.

The propylene-based matrix is preferably semi-crystalline, that is it is not 100% amorphous, nor is it 100% crystalline. For example, the propylene-based matrix is at least 40% crystalline, for example at least 50%, for example at least 60% crystalline and/or for example at most 80% crystalline, for example at most 70% crystalline. For example, the propylene-based matrix has a crystallinity of 60 to 70%. For purpose of the invention, the degree of crystallinity of the propylene-based matrix is measured using differential scanning calorimetry (DSC) according to ISO11357-1 and ISO11357-3 of 1997, using a scan rate of 10° C./min, a sample of 5 mg and the second heating curve using as a theoretical standard for a 100% crystalline material 207.1 J/g.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.5 to 10 microns, as may be determined by transmission electron microscopy (TEM).

The MFI of the dispersed ethylene α-olefin copolymer (before it is mixed into the heterophasic propylene copolymer) may for example be in the range from 0.001 to 10 dg/min (measured according to ISO1133 (2.16 kg/230° C.)), preferably in the range from 0.006 to 5 dg/min.

The MFI of the dispersed ethylene α-olefin copolymer ($MFI_{EPR}$) may also be calculated taking into account the MFI of the propylene-based matrix ($MFI_{PP}$), the MFI of the heterophasic propylene copolymer (MFIheterophasic) and matrix content (amount of the matrix in the heterophasic propylene copolymer) and rubber content (RC) (amount of the matrix and the dispersed ethylene-α-olefin copolymer in the heterophasic propylene copolymer) according to the following formula:

$$MFIEPR = 10^{\wedge}\left(\frac{\text{Log } MFI\text{heterophasic} - \text{matrix content} * \text{Log } MFIPP}{\text{rubber content}}\right)$$

Preferably, the MFI of the dispersed ethylene α-olefin copolymer is at least 0.001 dg/min, for example at least 0.005 dg/min, and/or for example at most 4 dg/min, at most 3 dg/min, at most 2 dg/min, at most 1 dg/min, at most 0.5 dg/min, at most 0.4 dg/min, at most 0.3 dg/min, at most 0.2 dg/min or at most 0.1 dg/min, measured according to according to above formula or ISO1133 (2.16 kg/230° C.).

The dispersed ethylene-α-olefin copolymer is present in an amount of 40 to 5 wt %, for example in an amount of 35 to 6 wt % based on the total heterophasic propylene copolymer, for example in an amount of at least 7 wt % and/or for example in an amount of at most 10 wt % based on the total heterophasic propylene copolymer. Preferably, the dispersed ethylene-α-olefin copolymer is present in an amount of 5-10 wt % based on the total heterophasic propylene copolymer.

In the heterophasic polypropylene in the composition of the invention, the sum of the total weight of the propylene-based matrix and the total weight of the dispersed ethylene-α-olefin copolymer is 100 wt %

Preferably, the amount of ethylene in the ethylene-α-olefin copolymer is in the range of 15-65 wt % based on the ethylene-α-olefin copolymer. More preferably, the amount of ethylene in the ethylene-α-olefin copolymer is 20-62 wt %, more preferably 30-60 wt %, based on the ethylene-α-olefin copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

Preferably, the heterophasic propylene copolymer according to the invention has an MFI of 0.1-100 dg/min, more preferably 0.1-70 dg/min, more preferably 0.1-50 dg/min, more preferably 0.1-10 dg/min, more preferably 0.1-5 dg/min, more preferably 0.1-2.0 dg/min, more preferably 0.2-0.5, more preferably 0.3-0.5 dg/min. Preferably, the heterophasic propylene copolymer according to the invention has an MFI of 0.1-0.5 dg/min. The MFI is determined according to ISO1133 at 230° C. and 2.16 kg.

(B) Talc

Talc is a relatively abundant, inexpensive, highly hydrophobic and generally unreactive mineral. It can be categorized as a hydrated magnesium silicate and its main components can be represented by, inter alia, one or more of the formulas $(Si_2O_5)_2Mg_3(OH)_2$, $Si_8Mg_6O_{20}(OH)_4$ or $Mg_{12}Si_{16}O_{40}(OH)_8$. Talcs suitable for use as additives to a heterophasic propylene copolymer are commercially available from for example Imerys Luzenac. 'Talc' and 'talcum' are used interchangeably herein.

Talc is available in several particle sizes, for example the particle sizes of talc are classified as 'ultrafine' (average particle size $d_{50}$ of lower than 1 μm, for example an average particle size $d_{50}$ in the range of 0.5 to 0.9 μm) and 'fine' (average particle size $d_{50}$ of at least 1 μm, for example an average particle size $d_{50}$ of 1 μm to 5 μm). Preferably, fine or ultrafine powder particles are used in the process of the present invention.

The average particle size $d_{50}$ is determined according to ISO 13317-3. The $d_{50}$ may be measured by sedimentation analysis, according to Stoke's Law using an apparatus from Sedigraph.

The amount of talc in the composition is 0.025-10 wt % based on the total composition. Depending on the desired stiffness, the amount of talc used may be varied. Typically, the amount of talc in the composition is at most 7.5 wt %. For practical reasons, the amount of talc in the composition of the invention is preferably at most 5 wt % based on the total composition. For example, the amount of talc in the composition is at most 4 wt %, at most 3.5 wt % or at most 3 wt %, based on the total composition. For example, the amount of talc in the composition is at least 0.05 wt %, at least 0.1 wt %, at least 0.25 wt %, at least 0.5 wt %, at least 1 wt %, at least 1.5 wt % or at least 2 wt %, based on the total composition. Particularly preferred amount of the talc in the composition is 1-5 wt % based on the total composition.

Preferably, at least part of the talc is surface-modified. The combination of the surface-modified talc and the functionalized polyolefin was found to further increase the crystallization temperature and improve mechanical properties such as the flexural modulus and the impact strength.

Other words that are commonly used for surface-modified talc are surface-treated talc or surface coated talc. Surface-modified talc's are known to the person skilled in the art and are commercially available from for example Imerys Luzenac. Surface-modified talcs may be prepared by adding a surface modifier to the talc. The nature and concentration of the modifier depends on the desired benefit in the final talc composite, like improvement of the bond between the talcum and polymer or to improve the dispersion of the talc in the polymer. Examples of surface modifiers are silanes, amines, glycols, stearates, sorbates, titanates and amides. An example of the amides is ethylene-bis-steramid.

Preferably, the surface-modified talc is a talc that is surface-modified with a polar substance selected from the group of glycols, silanes, amines and amides.

Preferably, at least part of the talc is surface-modified, that means that mixtures of surface-modified talc with non-surface modified talc may also be used. Preferably, at least 80 wt % of the talc used in the process of the invention or present in the composition of the invention is surface-modified, more preferably at least 90 wt %, even more preferably at least 95 wt %, in particular at least 98 wt %, more in particular at least 99 wt %, most in particular all talc used in the process of the invention or present in the composition of the invention is surface-modified. The higher the wt % of surface-modified talc based on the talc used, the higher degree of increase in the crystallization temperature, the flexural modulus and the impact strength is observed.

(C) Functionalized Polypropylene

The composition according to the invention comprises (C) 0.005-2.5 wt % of a functionalized polypropylene grafted with an acid or acid anhydride functional group based on the total weight of the composition. The polypropylene may be a propylene homopolymer or a propylene copolymer. The propylene copolymer may be a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix. Preferably, the α-olefin in the propylene-α-olefin copolymer is selected from the group of α-olefins having 2 or 4-10 carbon atoms and is preferably ethylene. Examples of the acid or acid anhydride functional groups include (meth)acrylic acid and maleic anhydride. A particularly suitable material is for example maleic acid functionalized propylene homopolymer (for example Exxelor PO 1020 supplied by Exxon).

The amount of the functionalized polypropylene in the composition is preferably 0.01-2.0 wt %, for example 0.02-1.5 wt %, 0.05-1.0 wt %, 0.1-0.75 wt % or 0.2-0.5 wt %, based on the total composition. Particularly preferred amount of the functionalized polypropylene in the composition is 0.01-0.5 wt % based on the total composition.

The weight ratio between the talc and the functionalized polypropylene is typically 100:1 to 10:1, for example 50:1 to 20:1.

(D) Optional Components

The composition according to the invention may optionally comprise at least one optional component (D). Examples of optional components (D) are peroxides and additives. The amount of the optional component (D) is typically 0 to 30 wt % of the total of the composition.

Peroxides

It is known to add peroxides to the heterophasic propylene copolymer to obtain impact propylene copolymers having a higher melt flow rate. This makes it for example possible to obtain several impact propylene copolymers with different melt flow rates from one and the same base grade.

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate.

In some embodiments, the heterophasic polypropylene copolymer in the composition according to the invention can be melt-mixed with a peroxide, such as organic peroxides mentioned above.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

When a peroxide is used, the amount of peroxide will typically lie in the range of 0.02 to 0.5 wt % based on the heterophasic propylene copolymer.

In preferred embodiments, the copolymer in the composition according to the invention is prepared without using a peroxide. The absence of the use of the peroxide in the preparation of the copolymer can be verified by the copolymer comprising no detectable amount of the peroxide.

Additives

The compositions of the invention may further comprise additives as optional component (D). As additives, the compositions may contain clarifiers, release agents, pigments, dyes, plasticizers, anti-oxidants, antistatics, scratch resistance agents, high performance fillers, impact modifiers, flame retardants, blowing agents, recycling additives, coupling agents, anti microbials, anti-fogging additives, slip additives, anti-blocking additives, polymer processing aids such as lubricants and the like, etc., surface tension modifiers, co-agents, for example 1,4-butanediol dimethacrylate (BDDMA), acrylate or methacrylate, inorganic filler such as glass beads or glass fibers, mica, calcium carbonate, wollastonite. It will be appreciated that the term "inorganic filler" herein does not include talc. Such additives are well known in the art. The skilled person can readily select any suitable combination of additives and additive amounts without undue experimentation. The amount of additives depends on their type and function. Typically, their total amounts will be from 0 to 30 wt %, for example from 0 to 20 wt %, for example from 0 to 10 wt %, from 0 to 5 wt %, from 0 to 3 wt %, from 0 to 2 wt % or from 0 to 1 wt %, from 0 to 0.5 wt % or from 0.1 wt %, based on the total composition. Most typically, their amounts are from 0.1 to 1 wt %, based on the total composition.

The sum of all components added in the process of the invention to form the composition comprising (A) the heterophasic propylene copolymer, (B) the talc, (C) the functionalized polypropylene and (D) the optional components should add up to 100% by weight.

Preferably, the total of components (A), (B) and (C) is at least 70 wt %, at least 80 wt %, at least 90 wt %, at least 95 wt %, at least 97 wt %, at least 98 wt %, at least 99 wt %, at least 99.5 wt %, at least 99.9 wt % or 100 wt % of the total composition.

The invention further relates to a composition comprising no or little amount of a polypropylene homopolymer as an additional component to components (A), (B) and (C). The amount of the polypropylene homopolymer in the composition according to the invention may be at most 5 wt %, at most 3 wt %, at most 1 wt %, at most 0.5 wt %, at most 0.1 wt % or 0 wt %.

In some embodiments, the composition according to the invention comprises glass beads or glass fibers as an additional component to components (A), (B) and (C). The amount of the glass beads or glass fibers may e.g. be 5 to 30 wt %, e.g. 10 to 25 wt %, e.g. 15 to 20 wt %. The invention further relates to a composition comprising no or little amount of glass beads or glass fibers as an additional component to components (A), (B) and (C). The amount of the glass beads or glass fibers may e.g. be at most 5 wt %, at most 3 wt %, at most 1 wt %, at most 0.5 wt %, at most 0.1 wt % or 0 wt %.

In some embodiments, the composition according to the invention comprises impact modifiers such as ethylene-α-olefin copolymer as an additional component to components (A), (B) and (C). The amount of the impact modifiers may e.g. be 5 to 30 wt %, e.g. 10 to 25 wt %, e.g. 15 to 20 wt %. The invention further relates to a composition comprising no or little amount of impact modifiers such as ethylene-α-olefin copolymer as an additional component to components (A), (B) and (C). The amount of the impact modifiers such as ethylene-α-olefin copolymer in the composition according to the invention may be at most 5 wt %, at most 3 wt %, at most 1 wt %, at most 0.5 wt %, at most 0.1 wt % or 0 wt %.

Process

The composition of the invention may be obtained by a process comprising melt-mixing (A) the heterophasic copolymer, (B) the talc, (C) the functionalized polypropylene and (D) the optional component by using any suitable means. Accordingly, the invention further relates to a process for the preparation of the composition according to the invention comprising melt mixing (A), (B) and (C) and optionally (D). Preferably, the composition of the invention is made in a form that allows easy processing into a shaped article in a subsequent step, like in pellet or granular form. The composition can be a mixture of different particles or pellets; like a blend of the heterophasic copolymer and a masterbatch of additives. Preferably, the composition of the invention is in pellet or granular form as obtained by mixing all components in an apparatus like an extruder; the advantage being a composition with homogeneous and well-defined concentrations of the additives.

The process according to the invention may comprise the steps of: preparing a masterbatch by melt-mixing a portion of (A) the heterophasic copolymer, (B) the talc, (C) the functionalized polypropylene and melt-mixing the masterbatch and remainder of (A) the heterophasic copolymer. Lower amounts of (B) and (C) may be necessary for achieving the same degree of increase of the crystallization temperature.

With melt-mixing is meant that the components (B), (C) and optional (D) are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 265° C.; lower temperatures may not lead to compositions with the desired melt flow index; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

Properties

The composition according to the invention may have an MFI which is not largely different from the MFI of the heterophasic propylene copolymer. Preferably, the composition according to the invention has an MFI of 0.1-100 dg/min, more preferably 0.1-70 dg/min, more preferably 0.1-50 dg/min, more preferably 0.1-10 dg/min, more preferably 0.1-5 dg/min, more preferably 0.1-2.0 dg/min, more preferably 0.2-0.5 dg/min, more preferably 0.3-0.5 dg/min. Preferably, the composition according to the invention has an MFI of 0.1-0.5 dg/min. The MFI is determined according to ISO1133 at 230° C. and 2.16 kg.

The composition according to the invention has a relatively high crystallization temperature, a high impact resistance at room temperature, a high flexural modulus, a low shrinkage and a low warpage.

The crystallization temperature is preferably at least 120° C. determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C., more preferably at least 122° C., most preferably at least 125° C.

The Izod impact resistance is preferably at least 13 kJ/m$^2$, determined according to ISO 180 4A at 23° C., notch 45° according to ISO 37/2 perpendicular orientation, more preferably at least 15 kJ/m$^2$, most preferably at least 16 kJ/m$^2$.

The flexural modulus preferably is at least 1700 N/mm$^2$, determined according to ASTM D790-10. The flexural modulus can be determined parallel (II) or perpendicular (L). The flexural modulus is more preferably at least 1800 N/mm$^2$, most preferably at least 1900 N/mm$^2$.

The average shrinkage after subjecting the specimen at 23° C. for 24 hours preferably is below 1.70%, determined according to ISO 294-4, more preferably below 1.69%, most preferably below 1.66%.

The average shrinkage after subjecting the specimen at 23° C. for 24 hours and at 90° C. for 1 hour preferably is below 1.90%, determined according to ISO 294-4, more preferably below 1.85%, most preferably below 1.80%.

The warpage preferably is below 0.90, determined subjecting the specimen at 23° C. for 24 hours according to ISO 294-4, more preferably below 0.86, most preferably below 0.85.

The composition according to the invention preferably has a crystallization temperature at least 120° C., determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C. and at least one of an Izod impact resistance of at least 13 kJ/m$^2$, determined according to ISO 180 4A at 23° C., notch 45° according to ISO 37/2 perpendicular orientation; a flexural modulus of at least 1800 N/mm$^2$, determined according to ASTM D790-10; an average shrinkage below 1.70%, determined according to ISO 294-4; and a warpage below 0.90, determined after 24 hours at 23° C. according to ISO 294-4.

The composition according to the invention may be processed by any conventional technique known in the art into an article. Suitable examples of processing techniques wherein the composition according to the invention may be used include injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, thermoforming or thin-walled injection moulding.

The invention further relates to an article comprising the composition according to the invention. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

A particularly advantageous example of the article of the invention is a sewage pipe. The composition according to the invention has excellent properties to be processed into and used as a sewage pipe.

The invention also relates to the use of talc and a functionalized polypropylene grafted with an acid or acid anhydride functional group for increasing the crystallization temperature, determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C., of a composition comprising a heterophasic propylene polymer, wherein the heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
wherein the propylene-based matrix is present in an amount of 60 to 95 wt % based on the total heterophasic propylene copolymer and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %. The increase in the crystallization temperature is preferably at least 1.5° C.

The invention also relates to the use of talc and a functionalized polypropylene grafted with an acid or acid anhydride functional group for increasing the crystallization temperature, determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C., of a composition comprising a heterophasic propylene polymer, wherein the heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
wherein the propylene-based matrix is present in an amount of 90 to 95 wt % based on the total heterophasic propylene copolymer and
(b) a dispersed ethylene-α-olefin copolymer, wherein the dispersed ethylene-α-olefin copolymer is present in an amount of 10 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
wherein the heterophasic propylene copolymer has an MFI of 0.1-0.5 dg/min as determined according to ISO1133 at 230° C. and 2.16 kg. The increase in the crystallization temperature is preferably at least 1.5° C.

Preferably, in the use according to the invention, the amount of the talc in the composition is 0.025-10 wt % of the total composition and the amount of the functionalized polypropylene is 0.005-2.5 wt % of the total composition.

Further the invention relates to the use of a surface modified talc and a functionalized polypropylene grafted with an acid or acid anhydride functional group for increasing the crystallization temperature, determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C., and at least one of increasing the Izod impact resistance determined according to ISO 180 4A at 23° C., notch 45° according to ISO 37/2 perpendicular orientation, increasing the flexural modulus determined according to ASTM D790-10 of a composition comprising a heterophasic propylene polymer, wherein the heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
wherein the propylene-based matrix is present in an amount of 60 to 95 wt % based on the total heterophasic propylene copolymer and
(b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %.

Further the invention relates to the use of a surface modified talc and a functionalized polypropylene grafted with an acid or acid anhydride functional group for increasing the crystallization temperature, determined by DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C., and at least one of increasing the Izod impact resistance determined according to ISO 180 4A at 23° C., notch 45° according to ISO 37/2 perpendicular orientation, increasing the flexural modulus determined according to ASTM D790-10 of a composition comprising a heterophasic propylene polymer, wherein the heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
wherein the propylene-based matrix is present in an amount of 90 to 95 wt % based on the total heterophasic propylene copolymer and
(b) a dispersed ethylene-α-olefin copolymer, wherein the dispersed ethylene-α-olefin copolymer is present in an amount of 10 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
wherein the heterophasic propylene copolymer has an MFI of 0.1-0.5 dg/min as determined according to ISO1133 at 230° C. and 2.16 kg.

Preferably, in the use according to the invention, the amount of the talc in the composition is 0.025-10 wt % of the total composition and the amount of the functionalized polypropylene is 0.005-2.5 wt % of the total composition.

Further the invention relates to a nucleating agent for a composition comprising a heterophasic propylene polymer, wherein the nucleating agent comprises talc and a functionalized polypropylene grafted with an acid or acid anhydride functional group, wherein the heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 60 to 95 wt % based on the total heterophasic propylene copolymer and (b) a dispersed ethylene-α-olefin copolymer, wherein the dispersed ethylene-α-olefin copolymer is present in an amount of 40 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %.

Further the invention relates to a nucleating agent for a composition comprising a heterophasic propylene polymer, wherein the nucleating agent comprises talc and a functionalized polypropylene grafted with an acid or acid anhydride functional group, wherein the heterophasic propylene copolymer consists of (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 90 to 95 wt % based on the total heterophasic propylene copolymer and (b) a dispersed ethylene-α-olefin copolymer, wherein the dispersed ethylene-α-olefin copolymer is present in an amount of 10 to 5 wt % based on the total heterophasic propylene copolymer and wherein the sum of the total amount of propylene-based matrix and total amount of the dispersed ethylene-α-olefin copolymer in the heterophasic propylene copolymer is 100 wt % wherein the heterophasic propylene copolymer has an MFI of 0.1-0.5 dg/min as determined according to ISO1133 at 230° C. and 2.16 kg.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES 1-3 AND COMPARATIVE EXPERIMENTS A-D

The sample of comparative experiment A was prepared from a heterophasic propylene copolymer having a melt flow index (MFI) of 0.34 dg/min. The heterophasic propylene copolymer has a propylene polymer matrix which is a propylene homopolymer. The propylene polymer matrix is present in an amount of 91 wt % based on the total heterophasic propylene copolymer and 9 wt % of an ethylene-propylene copolymer consisting of 58 wt % of ethylene is present as the dispersed phase.

The heterophasic propylene copolymer powder (3.75 kg) was extruded in a twin screw ZE21 extruder. The following additives were also added to the extruder: 500 ppm of the processing aid calcium stearate, 500 ppm of the processing aid zinc stearate, 4000 ppm of the stabilizer Irganox 1010, 1500 ppm of stabilizer Irgafos 168, 250 ppm of the nucleating agent Hyperform HPN-20E were added. The amounts are with respect to the total composition of all components.

For comparative experiment B and example 1, 2.5 wt % of talc was added. For comparative experiments C and D and examples 2 and 3, 5.0 wt % of talc was added. The amounts are with respect to the total composition of the all components.

For comparative experiments B-C and examples 1-2, the talc used was a surface coated talc having d50 of 1.9 μm (Sedimentation analysis, Stoke's Law (ISO 13317-3) Laser diffraction). For comparative experiment D and example 3, the talc used was a non-coated talc having d50 of 1.9 μm (Sedimentation analysis, Stoke's Law (ISO 13317-3) Laser diffraction).

For examples 1, 2 and 3, 1000 ppm of functionalized polypropylene (propylene homopolymer modified with maleic anhydride (Exxelor PO 1020) was further added. The amount is with respect to the total composition of all components.

Additives, talc and the functionalized polypropylene were mixed with the heterophasic copolymer prior to dosing it to the hopper of the extruder.

The temperature profile in the extruder was 20-20-30-50-100-170-220-220-240° C., at a throughput of 2.5 kg/h at 300 rpm.

The samples from the compounding step were injection moulded into test specimens using an Arburg 60T injection-moulding machine. For mechanical measurements 65*65*3.2 mm thick test plaques were moulded.

Testing

The mechanical properties of the samples were determined as follows:

Flow was determined by measuring the melt flow index (MFI), also called melt flow rate or melt index, according to ISO1133 (2.16 kg/230° C.).

Impact strength was determined by measuring the Izod impact strength at 23° C. according to ISO 180 4A. Test geometry: 65*12.7*3.2 mm, notch 45° according to ISO 37/2 perpendicular orientation.

Stiffness was determined by measuring the flexural modulus according to ASTM D790-10. Flexural modulus was determined on 3.2 mm thick specimens according to ISO37/2, parallel and perpendicular orientation.

Shrinkage 3-D and warpage were measured according to ISO 294-4.

The crystallization temperature was determined by means of differential scanning calorimetry (DSC). The measurement was carried out in accordance with ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C. The melting point is the temperature at which the enthalpy versus temperature curve measured during the second heating step displays a maximum.

The results of the tests are shown in Table 1.

Results

TABLE 1

| | | Example |  |  |  |  |  |  |
|---|---|---|---|---|---|---|---|---|
| | | A | B | 1 | C | 2 | D | 3 |
| | | | | | Talc | | | |
| | | — | 2.5 wt % (modified) | 2.5 wt % (modified) | 5.0 wt % (modified) | 5.0 wt % (modified) | 5.0 wt % (non-modified) | 5.0 wt % (non-modified) |
| Functionalized polypropylene | | — | — | 0.1 wt % | — | 0.1 wt % | — | 0.1 wt % |
| MFI | dg/min | 0.34 | 0.34 | 0.36 | 0.34 | 0.36 | 0.48 | 0.46 |
| Izod impact 23° C. | kJ/m$^2$ | 13.08 | 15.35 | 16.98 | 15.22 | 17.59 | 13.52 | 13.29 |
| Flexural modulus 23° C. II | N/mm$^2$ | 1642 | 1852 | 1944 | 1958 | 2065 | 1956 | 2065 |
| Flexural modulus 23° C. L | N/mm$^2$ | 1473 | 1781 | 1889 | 1928 | 2018 | 1910 | 1879 |
| Average shrinkage after 24 hrs at 23° C. | % | 1.7531 | 1.6672 | 1.6855 | 1.6423 | 1.6305 | 1.5443 | |
| Average shrinkage after 24 hrs at 23° C. + 1 hr at 90° C. | % | 1.9312 | 1.8200 | 1.8227 | 1.8248 | 1.7975 | 1.6695 | |
| Warpage 24 hrs at 23° C.: | — | 1.0068 | 0.8573 | 0.8540 | 0.8412 | 0.8382 | 0.8985 | |
| Warpage: 24 hrs at 23° C. + 1 hr at 90° C. | — | 1.0352 | 0.8520 | 0.8479 | 0.8499 | 0.8302 | 0.9526 | |
| Crystallisation temperature | ° C. | 114.7 | 123.8 | 126 | 124.8 | 128.8 | 124.6 | 127 |

The addition of talc and functionalized polypropylene to a heterophasic copolymer improves the crystallization temperature, impact strength, flexural modulus, shrinkage and warpage properties. The higher amount of talc results in a larger improvements of these properties.

When the talc used in combination with functionalized polypropylene is surface modified, further improvements in the crystallization temperature, impact strength, flexural modulus, shrinkage and warpage properties are observed.

The invention claimed is:

1. A composition comprising:
   (A) a heterophasic propylene copolymer,
   (B) talc and
   (C) a functionalized polypropylene grafted with an acid or acid anhydride functional group, wherein the heterophasic propylene copolymer consists of
      (a) a propylene-based matrix, wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 90 to 95 wt % based on the total heterophasic propylene copolymer and
      (b) a dispersed ethylene-α-olefin copolymer, wherein the dispersed ethylene-α-olefin copolymer is present in an amount of 10 to 5 wt % based on the total heterophasic propylene copolymer and wherein the sum of the total amount of propylene-based matrix and total amount of the dispersed ethylene-α-olefin copolymer in the heterophasic propylene copolymer is 100 wt %,
   wherein the heterophasic propylene copolymer has an MFI of 0.1-0.5 dg/min as determined according to ISO1133 at 230° C. and 2.16 kg and
   wherein the amount of the talc in the composition is 0.025-10 wt % of the total composition and the amount of the functionalized polypropylene is 0.005-2.5 wt % of the total composition.

2. The composition according to claim 1, wherein at least part of the talc is surface-modified.

3. The composition according to claim 2, wherein at least 80 wt % of the talc is surface-modified.

4. The composition according to claim 2, wherein the surface-modified talc is surface-modified with a polar substance selected from the group of glycols, silanes, amines and amides.

5. The composition according to claim 1, wherein the talc has an average particle size $d_{50}$ of 0.5 to 5 μm.

6. The composition according to claim 1, wherein the acid or acid anhydride functional group is selected from the group consisting of (meth)acrylic acid and maleic anhydride.

7. The composition according to claim 1, wherein the propylene-based matrix consists of a propylene homopolymer.

8. The composition according to claim 1, wherein the α-olefin in the ethylene-α-olefin copolymer is chosen from the group of α-olefins having 3 to 8 carbon atoms and any mixtures thereof and is preferably propylene.

9. The composition according to claim 1, wherein, the propylene-based matrix has an MFI of 0.2-0.5 dg/min as determined according to ISO1133 at 230° C. and 2.16 kg.

10. The composition according to claim 1, wherein the composition has a crystallization temperature at least 120° C., determined with DSC according to ISO 11357-1 to ISO11357-5 using a first heating step at a heating rate of 10 per minute up to 200° C., a dynamic crystallization at a cooling rate of 10° C. per minute down to 25° C. and a second heating step at a heating rate of 10° C. per minute up to 200° C.; and at least one of an Izod impact resistance of at least 13 kJ/m$^2$, determined according to ISO 180 4A at 23°

C., notch 45° according to ISO 37/2 perpendicular orientation; a flexural modulus of at least 1700 N/mm², determined according to ASTM D790-10; an average shrinkage below 1.70%, determined according to ISO 294-4; and a warpage below 0.90, determined after 24 hours at 23° C.

11. A process for the preparation of the composition according to claim 1, comprising melt mixing (A), (B) and (C).

12. A method for forming an article from the composition of claim 1, the method comprising: forming the composition into the article by injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, thermoforming or thin-walled injection moulding.

13. An article comprising the composition of claim 1.

14. The article according to claim 13, wherein the article is a sewage pipe.

15. A method for increasing crystallization temperature, the method comprising forming the composition of claim 1.

* * * * *